(12) United States Patent
Devarakonda et al.

(10) Patent No.: US 9,719,400 B2
(45) Date of Patent: Aug. 1, 2017

(54) EMISSIONS CONTROL NETWORK FOR HYBRID POWER PLANTS

(71) Applicant: General Electric Company, Schenectady, NY (US)

(72) Inventors: Maruthi Narasinga Rao Devarakonda, Waukesha, WI (US); Constantin Dinu, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/978,477

(22) Filed: Dec. 22, 2015

(65) Prior Publication Data

US 2017/0175610 A1    Jun. 22, 2017

(51) Int. Cl.
| | | |
|---|---|---|
| F01N 3/00 | (2006.01) |
| F01N 3/02 | (2006.01) |
| F01N 3/10 | (2006.01) |
| F01N 3/20 | (2006.01) |
| F01N 11/00 | (2006.01) |

(Continued)

(52) U.S. Cl.
CPC ........ F01N 11/007 (2013.01); B01D 53/9477 (2013.01); B01D 53/9495 (2013.01); F01N 3/035 (2013.01); F01N 3/2066 (2013.01); B01D 2251/2062 (2013.01); B01D 2251/2067 (2013.01); F01N 2560/02 (2013.01); F01N 2560/08 (2013.01); F01N 2610/02 (2013.01)

(58) Field of Classification Search
CPC .......... F01N 3/0821; F01N 3/18; F01N 3/206; F01N 3/2066; F01N 3/208; Y02T 10/24; Y02T 10/26

USPC .......... 60/272, 280, 286, 295, 297, 301, 311
See application file for complete search history.

(56) References Cited

U.S. PATENT DOCUMENTS

| | | | |
|---|---|---|---|
| 2013/0174555 A1 | 7/2013 | Gruber et al. | |
| 2013/0181461 A1* | 7/2013 | Gruber .................. | F01D 13/003 290/4 A |

(Continued)

FOREIGN PATENT DOCUMENTS

| | | |
|---|---|---|
| DE | 102010017563 A1 | 12/2011 |
| EP | 2942504 A1 | 11/2015 |

OTHER PUBLICATIONS

Extended European Search Report for EP Application No. 16205146.0 mailed Apr. 24, 2017; 7 Pages.

*Primary Examiner* — Nicholas J Weiss
*Assistant Examiner* — Dapinder Singh
(74) *Attorney, Agent, or Firm* — Fletcher Yoder, P.C.

(57) ABSTRACT

A system, includes an emissions reduction system, including a catalyst system comprising an oxidation catalyst assembly and a selective catalytic reduction catalyst assembly. The system includes a diesel particulate fuel assembly, a first and a second sensor upstream of the catalyst system configured to measure emissions of the exhaust flow of the gas engine and a gas turbine before flowing into the catalyst system to generate a first and a second signal. A third sensor is downstream of the catalyst system to measure emissions of the catalyst system to generate a third signal, and a fourth and a fifth sensor disposed upstream and downstream of the DPF assembly to measure a change in pressure to generate a fourth signal and a controller to generate a first control signal to control an amount of reductant based on at least the first, second, and third signals.

20 Claims, 4 Drawing Sheets

(51) Int. Cl.
*B01D 53/94* (2006.01)
*F01N 3/035* (2006.01)

(56) References Cited

U.S. PATENT DOCUMENTS

2015/0135679 A1 5/2015 Devarakonda
2015/0336052 A1 11/2015 Hogan et al.

* cited by examiner

EMISSIONS CONTROL NETWORK FOR HYBRID POWER PLANTS

BACKGROUND

The subject matter disclosed herein relates to a nitrogen oxides ($NO_x$) conversions system for a hybrid power plant and, more specifically to controlling a temperature of an exhaust flow of the hybrid power plant.

Hybrid power plants (e.g., including a combination of internal combustion engines such as gas engines and gas turbines) generate power utilizing a combination of different resources. These resources may generate various emissions (e.g., nitrogen oxides ($NO_x$), carbon monoxide (CO), ammonia ($NH_3$)). There is a need to reduce the level of emissions generated by the hybrid power plant.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes an emissions reduction system to treat emissions from a hybrid power plant. The emissions reduction system includes a catalyst system having an oxidation catalyst assembly and a selective catalytic reduction (SCR) catalyst assembly. The system includes a diesel particulate fuel assembly (DPF) configured to reduce particulates or soot from an exhaust flow from a gas engine. The system includes a first sensor disposed upstream of the catalyst system configured to measure one or more emissions of the exhaust flow of the gas engine prior to flowing into the catalyst system to generate a first signal representative of the one or more emissions. The system includes a second sensor disposed upstream of the catalyst system configured to measure one or more emissions of an exhaust flow of a gas turbine engine prior to flowing into the catalyst system to generate a second signal representative of the one or more emissions. The system includes a third sensor disposed downstream of the catalyst system configured to measure a one or more emissions of an outlet of the catalyst system to generate a third signal representative of the one or more emissions. The system includes a fourth sensor disposed upstream of the DPF assembly and a fifth sensor disposed downstream of the DPF assembly, where the fourth and fifth sensors are configured to measure a change in pressure across the DPF assembly and generate a fourth signal and a fifth signal representative of the change in pressure. The system includes a controller communicatively coupled to the catalyst system and the sensors, wherein the controller is programmed to receive the first, the second, the third, the fourth, and the fifth signals to generate a first control signal representative of a reductant injection command to control an amount of reductant injected, via an injection system, into a mixture of the exhaust flows of the gas engine and the gas turbine engine prior to flowing into the catalyst assembly based on at least the first, second, and third signals.

In a second embodiment, a hybrid power plant a gas turbine engine and a gas engine. The hybrid power plant includes an emissions reduction system with a catalyst system having an oxidation catalyst assembly and a selective catalytic reduction (SCR) catalyst assembly. The hybrid power plant includes a diesel particulate fuel assembly configured to reduce particulates or soot from an exhaust flow from a gas engine. The hybrid power plant includes a first sensor disposed upstream of the catalyst system configured to measure one or more emissions of the exhaust flow of the gas engine prior to flowing into the catalyst system to generate a first signal representative of the one or more emissions. The hybrid power plant includes a second sensor disposed upstream of the catalyst system configured to measure one or more emissions of an exhaust flow of a gas turbine engine prior to flowing into the catalyst system to generate a second signal representative of the one or more emissions. The hybrid power plant includes a third sensor disposed downstream of the catalyst system configured to measure a one or more emissions of an outlet of the catalyst system to generate a third signal representative of the one or more emissions. The hybrid power plant includes a fourth sensor disposed upstream of the DPF assembly and a fifth sensor disposed downstream of the DPF assembly, where the fourth and fifth sensors are configured to measure a change in pressure across the DPF assembly and generate a fourth signal and a fifth signal representative of the change in pressure. The hybrid power plant includes a controller communicatively coupled to the catalyst system and the sensors, wherein the controller is programmed to receive the first, the second, the third, the fourth, and the fifth signals to generate a first control signal representative of a reductant injection command to control an amount of reductant injected, via an injection system, into a mixture of the exhaust flows of the gas engine and the gas turbine engine prior to flowing into the catalyst assembly based on at least the first, second, and third signals.

In a third embodiment, a method for operating a hybrid power plant having a gas turbine engine and a gas engine includes receiving a first signal representative one or more emissions of an exhaust flow of the gas engine prior to flowing into the catalyst system. The method includes receiving a second signal representative of a one or more emissions of an exhaust flow of the gas turbine engine prior to flowing into the catalyst system. The method includes receiving a third signal representative of one or more emissions of an outlet of the catalyst system. The method includes receiving a fourth signal and a fifth signal representative of a change in pressure across a diesel particulate filter (DPF) assembly. The method includes generating a control signal based at least in part on the first signal, the second signal, the third signal, the fourth, and the fifth signal to regulate an amount of reductant injected upstream of the catalyst system. The method includes regulating a level of emissions reduction from the exhaust flows from the gas turbine and the gas engine.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods that utilize aftertreatment systems (e.g., oxidation catalyst, selective catalyst reduction (SCR)) for reduction of emissions from engine exhaust flows emitted from a hybrid power plant such as exhaust flows from a gas turbine engine, reciprocating engine, gas engine). Lean burn gas engines may emit higher soot or particulate matter emissions compared to turbine engines. As such, the exhaust of the lean burn gas engine may need to be regenerated before the gas engine exhaust mixes with the turbine exhaust upstream of the catalyst assembly (e.g., oxidation catalyst, SCR catalyst). The exhaust from the lean burn gas engine may be passively regenerated. In particular, embodiments of the present disclosure utilize a controller to cause a desired amount of reductant (e.g., urea, ammonia) to be injected upstream of the catalyst assembly based on signals generated by one or more sensors. The controller receives signals (e.g., a first sensor, a second sensor, a third sensor, a fourth sensor, a fifth sensor) from the aftertreatment systems to determine a desired amount of reductant to be injected into a mixture of the exhaust flow. For example, the controller may use signals representative of a pressure change across the diesel particulate filter (DPF) system, one or more engine output sensors (e.g., downstream of the gas engine), one or more gas turbine engine output sensors (e.g., downstream of the gas turbine engine), operating conditions of the engine, one or more aftertreatment sensors disposed downstream of the catalyst assembly. The exhaust flow may include a mixed exhaust flow (e.g., exhaust from the turbine engine and the gas engine) that is mixed after the gas engine exhaust is treated in a DPF system to reduce particulate matter and soot. The controller may be used to generate a first control signal which corresponds to an injection command to control an amount of reductant injected (e.g., via an injection system) into a mixture of the exhaust flows of the gas engine and the gas turbine engine.

Figure 1:
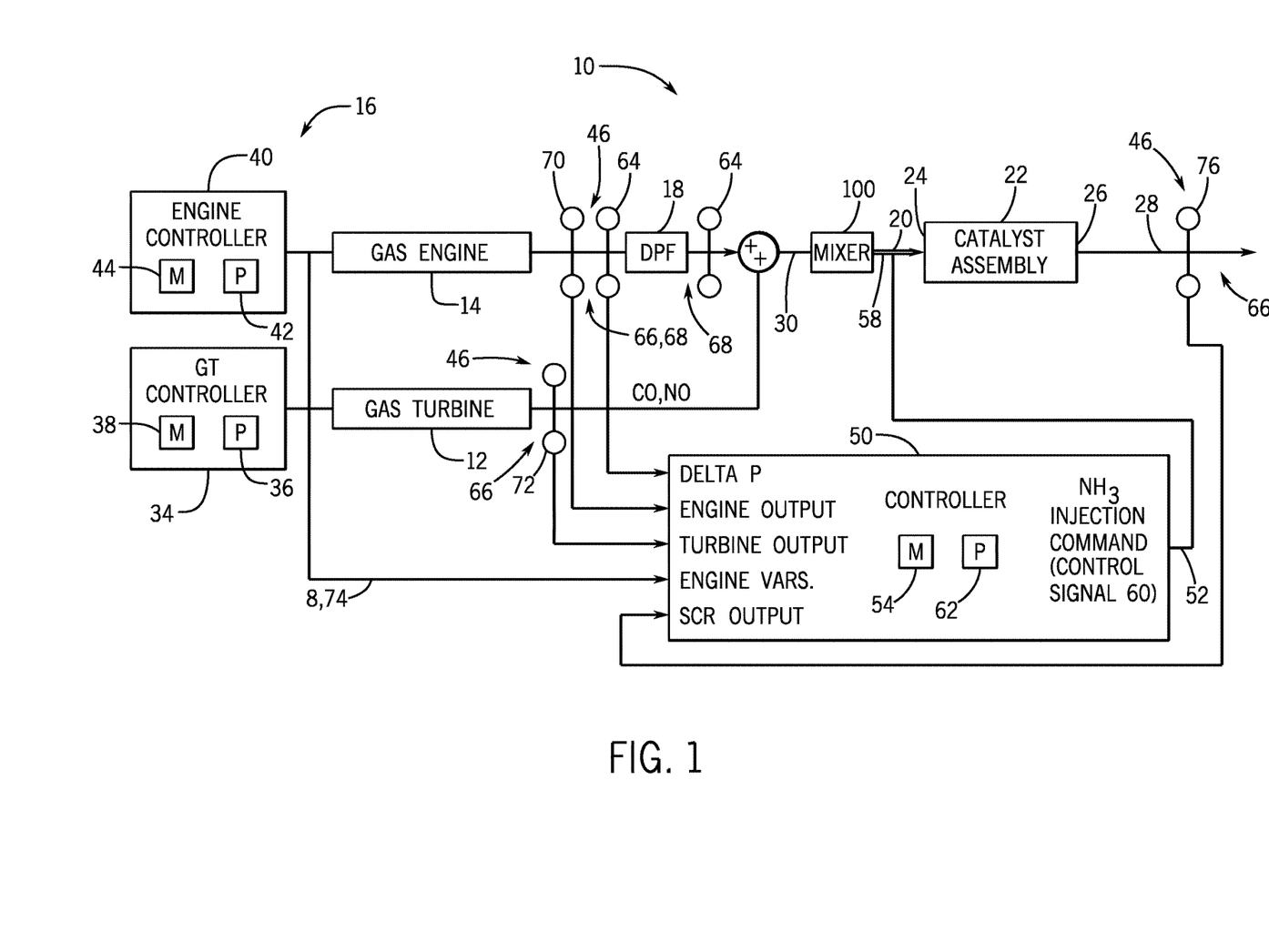
FIG. 1 is a schematic diagram of an embodiment of an exhaust treatment (e.g., aftertreatment) system coupled to an engine of a hybrid power plant.

Turning now to the figures, FIG. 1 is a schematic diagram of an embodiment of an exhaust treatment (e.g., aftertreatment) system 10 coupled to an engine 12, 14 of the hybrid power plant 16. As described in detail below, the disclosed exhaust treatment system 10 includes a diesel particulate filter (DPF) system 18 to reduce emissions of exhaust flows 20 flowing into a catalyst assembly 22 (e.g., oxidation catalyst, SCR catalyst). Lean burn gas engines 14 may emit higher soot or particulate matter emissions compared to gas turbine engines 12. As such, the exhaust of the lean burn gas engine 14 may need to be regenerated before the gas engine 14 exhaust mixes with the gas turbine 12 exhaust upstream of the catalyst assembly 22. The exhaust from the lean burn gas engine 14 may be passively regenerated (e.g., by allowing nitrogen oxide ($NO_2$) to reach with soot to form nitrogen oxide (NO)). During operation, the engines (e.g., gas turbine engine 12, gas engine 14) generate combustion gases used to apply a driving force to a component of the engines 12, 14 (e.g., one or more pistons or turbines). The combustion gases subsequently exit the engines 12, 14 as the exhaust gases 20, which includes a variety of emissions (e.g., $NO_x$, carbon monoxide (CO), ammonia ($NH_3$), etc.). The exhaust treatment system 10 treats these emissions to generate milder emissions (nitrogen ($N_2$), carbon dioxide ($CO_2$), water, etc.). As depicted, the exhaust treatment system 10 includes catalytic converters or catalysts assemblies, such as the catalyst assembly 22. In embodiments that include the catalyst assembly 22, the engines 12, 14 may be operated as a lean-burn engine, generating $NO_x$ emissions requiring reduction or other treatment via the catalyst assembly 22.

The catalyst assembly 22, via its catalytic activity, reduces $NO_x$ via multiple reactions. For example, $NO_x$ may be reduced via a gaseous reductant (e.g., urea) to generate $N_2$, $CO_2$, and $H_2O$, and $NO_x$ may be reduced via anhydrous or aqueous ammonia to generate $N_2$ and $H_2O$. Several secondary reactions may occur with anhydrous or aqueous ammonia resulting in ammonia sulfate and ammonia hydrogen sulfate. The catalyst assembly 22 includes an inlet 24 to receive the exhaust flows 20 from the hybrid power plant 16. The catalyst assembly 22 includes an outlet 26 to discharge an aftertreatment fluid 28 via the catalyst outlet 26. A fluid conduit 30 may fluidly couple the DPF system 18 to the catalyst assembly 22. The fluid conduit 30 may also fluidly couple the exhaust flows 20 from the gas turbine engine 12 and the gas engine 14 to the DPF system 18. Other equipment (e.g., a mixer 100 or other operating equipment) may be present between the engines 12, 14 and the DPF system 18 and/or the catalyst assembly 22 to prepare the catalyst assembly 22 for receiving the exhaust flow 20. The mixer 100 may mix the gas turbine 12 exhaust and the gas engine 14 exhaust to form a mixed exhaust flow 58. The mixed exhaust flow 58 and the gas turbine 12 exhaust may enter the catalyst assembly 22 to reduce emissions (e.g., $NO_x$, CO, $NH_3$) generated by the hybrid power plant 16.

The DPF system 18 may remove diesel particulate matter or soot from the exhaust 20 of the gas engine 14. The DPF system 18 may filter the exhaust flow 30 continuously as the gas engine 14 operates. The DPF system 18 may incidentally serve to reduce other engine emissions (e.g., CO, HC) in addition to the particulate matter. The DPF system 18 includes filtration equipment such as permeable channels or other similar equipment to reduce (e.g., trap) the particulate matter of the exhaust flow 20 in the DPF system 18 prior to entering the catalyst assembly 22.

The gas turbine engine 12 may include a heavy duty gas turbine engine, aeroderivative gas turbine, steam turbine, or other turbine engines. The gas engine 14 may include an internal combustion engine such as a reciprocating engine (e.g., multi-stroke engine such as two-stroke engine, four-stroke engine, six-stroke engine, etc.). The engines 12, 14 may operate on a variety fuels (e.g., natural gas, diesel, syngas, gasoline, etc.). The gas turbine engine 12 may be coupled to an engine control unit (e.g., controller) 34 that controls and monitors the operations of the engine 12. The controller 34 includes processing circuitry (e.g., processor 36) and memory circuitry (e.g., memory 38). The processor 36 may execute instructions to carry out the operation of the engine 12. The gas engine 14 may be coupled to an engine control unit (e.g., controller) 40 that controls and monitors the operations of the engine 14. The controller 40 includes processing circuitry (e.g., processor 42) and memory circuitry (e.g., memory 44). The processor 42 may execute instructions to carry out the operation of the gas engine 14. The exhaust flows 20 from the various engines 12, 14 includes various emissions (e.g., $NO_x$, hydrocarbons, $NH_3$) which are output at various temperatures and flow rates. Other engine operating parameters 8 (e.g., engine speed, engine load, fuel quality) may also be monitored by the controller 50.

Various sensors 46 are disposed throughout the aftertreatment system 10. The sensors 46 measure various operating conditions of the aftertreatment system 10, which are coupled to a controller 50. For example, a first sensor may be disposed upstream of the catalyst assembly and may generate a first signal representative of the one or more emissions of an exhaust flow of the gas engine prior to flowing in the catalyst assembly. A second sensor may be disposed upstream of the catalyst assembly and may generate a second signal representative of the one or more emissions of an exhaust flow of the gas turbine prior to flowing into the catalyst assembly. A third sensor may be disposed downstream of the catalyst assembly and may generate a third signal representative of an outlet of the catalyst assembly. As described in detail below, the controller 50 uses a model (e.g., a kinetic model) to generate a reductant (e.g., urea, ammonia) injection command 52. Some of the sensors 46 may measure emissions levels, temperature, pressure changes, concentrations, and so forth.

The controller 50 receives input from the sensors 46 disposed throughout the aftertreatment system 10 to generate a control signal 60. The control signal 60 outputs the reductant (e.g., urea, ammonia) injection command 52. In the illustrated embodiment, the controller 50 receives signals from a plurality of pressure sensors 64 disposed downstream 66 and upstream 68 of the DPF system 18. The pressure sensors 64 (e.g., a fourth sensors, a fifth sensor) may measure a change in pressure across the DPF assembly to generate a fourth signal and a fifth signal. The controller 50 may utilize the fourth signal and the fifth signal (e.g., indicative of a pressure change across the DPF system 18) in part to generate a first control signal representative of a reductant injection command to control an amount of reductant to be injected into a mixture of the exhaust flows. The controller 50 may receive signals from one or more engine output sensors 70 (e.g., sensors disposed downstream 66 of the gas engine 14). The engine output sensors 70 may generate signals representative of the gas engine 14 emissions. The controller 50 may receive signals from one or more engine output sensors 72 (e.g., sensors disposed downstream 66 of the gas turbine engine 12). The engine output sensors 72 may generate signals representative of the gas turbine engine 12 emissions. The controller 50 may receive signals representative of the operating conditions 8 (e.g., fuel quality, etc.) of the gas engine 14 via a control line 74 communicatively coupled to the controller 50. The controller 50 may also receive signals from one or more aftertreatment sensors 76 disposed downstream 66 of the catalyst assembly 22. The aftertreatment sensors 76 may generate signals representative of the emissions of the catalyst outlet. The controller 50 uses the signals received from the sensors 46 to output the control signal 60 to control an amount of reductant to be introduced (e.g., injected via an injection system) upstream of the catalyst assembly 22 via the reductant injection command 52. The amount of reductant depends at least in part on a desired level of emissions reduction (e.g., a desired level of $NO_x$ conversion is achieved).

Figure 2:
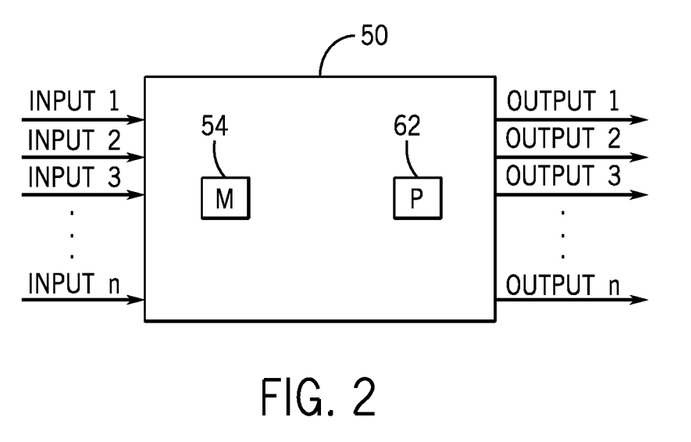
FIG. 2 is a block diagram of an embodiment of a controller (e.g., an electronic control unit (ECU))

FIG. 2 is a block diagram of an embodiment of a controller 50. As described above, the controller 50 generally outputs the control signal 60 based at least in part on the on one or more of the signals generated by the sensors 46. As described above, the signals received by the controller 50 may be representative of a pressure change across the DPF system 18, signals received by one or more engine output sensors 70 (e.g., sensors disposed downstream 66 of the gas engine 14), signals generated by one or more engine output sensors 72 (e.g., sensors disposed downstream 66 of the gas turbine engine 12), signals representative of the operating conditions 8, and signals generated by one or more aftertreatment sensors 76 disposed downstream 66 of the catalyst assembly 22. The controller 50 uses the signals received from the sensors 46 to output the control signal 60 to control an amount of reductant to be injected, via an injection system, upstream of the catalyst assembly 22 via the reductant injection command 52.

The controller 50 includes non-transitory code or instructions stored in a machine-readable medium (e.g., memory 54) and used by a processor (e.g., processor 62) to implement the techniques disclosed herein. The memory 54 may store various tables and/or models (e.g., software models representing and/or simulating various aspects of the hybrid power plant 16, the DPF system 18, and each engine 12, 14 of the hybrid power plant 16). In certain embodiments, the memory 54 may be wholly or partially removable from the controller 50. The controller 50 receives one or more input signals from sensors (input$_1$ . . . input$_n$) including engine inputs, and other components (e.g., user interface) of the hybrid power plant 16 and outputs one or more output signals (output$_1$ . . . output$_n$). The various input signals may include engine outputs (e.g., temperature, flow rate), emissions concentrations (e.g., $NH_3$ concentration), a pressure drop across the DPF system, or other operating conditions of the hybrid power plant 16. The output signals may include the reductant injection command 52 (e.g., control signal 60) to adjust the amount of reductant injected to the exhaust flows 20 prior to entering the catalyst assembly 22 or another adjustment to the system. The controller 50 may utilize one or more types of models (e.g., software-based models executable by a processor). For example, the models may include statistical models, such as regression analysis models. Regression analysis may be used to find functions capable of modeling future trends within a certain error range. Association techniques may be used to find relationship between variables. Also, the data utilized with the models may include historical data, empirical data, knowledge-based data, and so forth.

Figure 3:
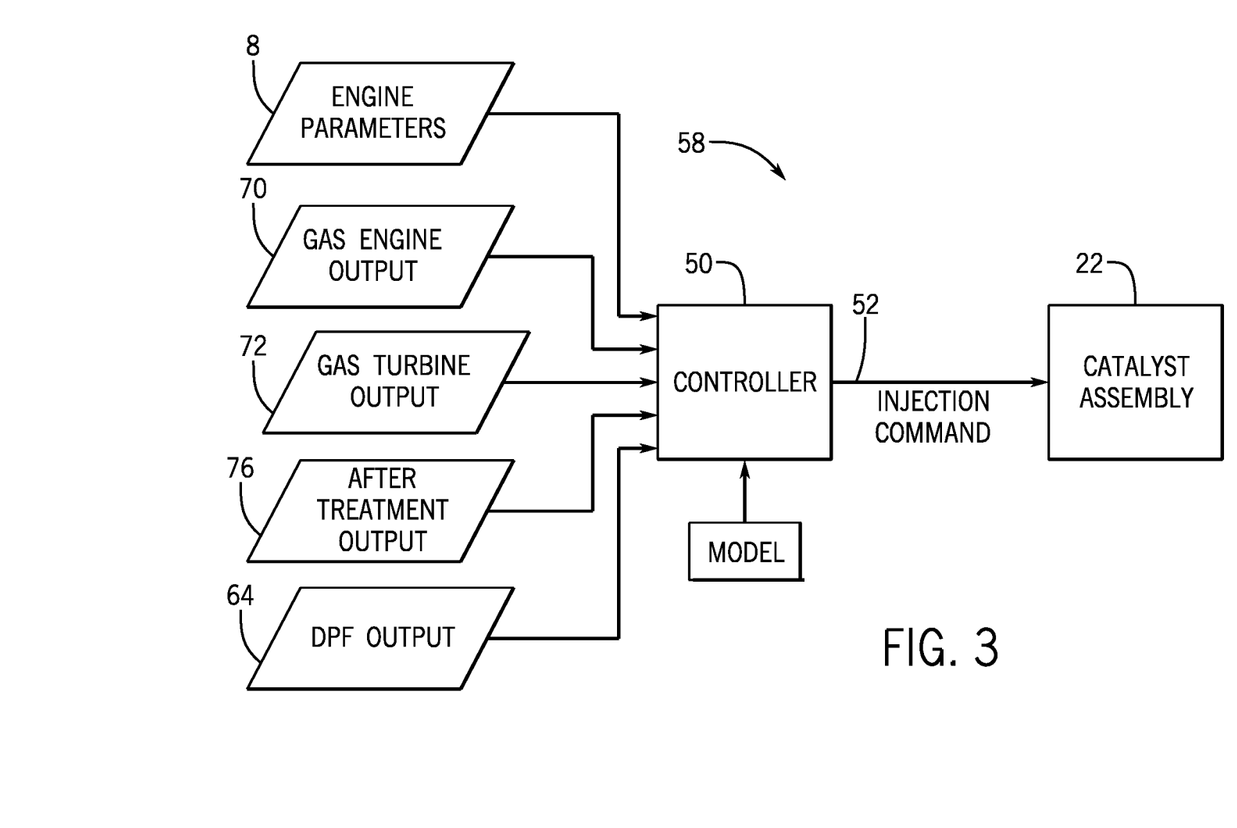
FIG. 3 is a schematic diagram of the functional operation of the controller to control the amount of reductant injected via the injection command upstream of the catalyst assembly of FIG. 1.

FIG. 3 is a schematic diagram of the functional operation of the controller 50 to control the amount of reductant injected via the injection command 52 upstream of the catalyst assembly 22 of FIG. 1. The pressure change across the DPF system 18 is measured via the pressure sensors 64 disposed downstream 66 and upstream 68 of the DPF system 18 and utilized in the controller 50. As depicted, the controller 50 may receive signals representative of emissions levels of the exhaust flows from the engines 12, 14 from the one or more engine output sensors 70 (e.g., sensors disposed downstream 66 of the gas engine 14) and the one or more engine output sensors 72 (e.g., sensors disposed downstream 66 of the gas turbine engine 12). The controller 50 may also receive measurements representative of the engine parameters 8. The controller 50 uses the signals received from the sensors (e.g., sensors 64, 70, 72, 76) to output the control signal 60 to control an amount of reductant to be injected (e.g., via an injection system) into the exhaust flows upstream of the catalyst assembly 22 via the reductant injection command 52. In an exemplary embodiment, the controller 50 may use a kinetics-based model to determine the amount of reductant that may be injected upstream of the catalyst assembly 22.

The amount of reductant (e.g., urea, ammonia) injected upstream of the catalyst assembly 22 is controlled by the control signal 60 (e.g., the injection command 52) output by the controller 50. The amount of reductant (e.g., urea, ammonia) the controller 50 causes to be injected upstream of the catalyst assembly 22 depends in part on the desired level of emissions (e.g., $NO_x$, $CO$, $NH_3$) reduction. At any time during the operation, an operator may interrupt the automatic control sequence of the controller 50 as described herein and manually change the operating parameters of the DPF system 18, the catalyst assembly 22, the gas turbine engine 12, and/or the gas engine 14 to effect the amount of reductant injected upstream of the catalyst assembly 22 via the reductant injection command 52.

Figure 4:
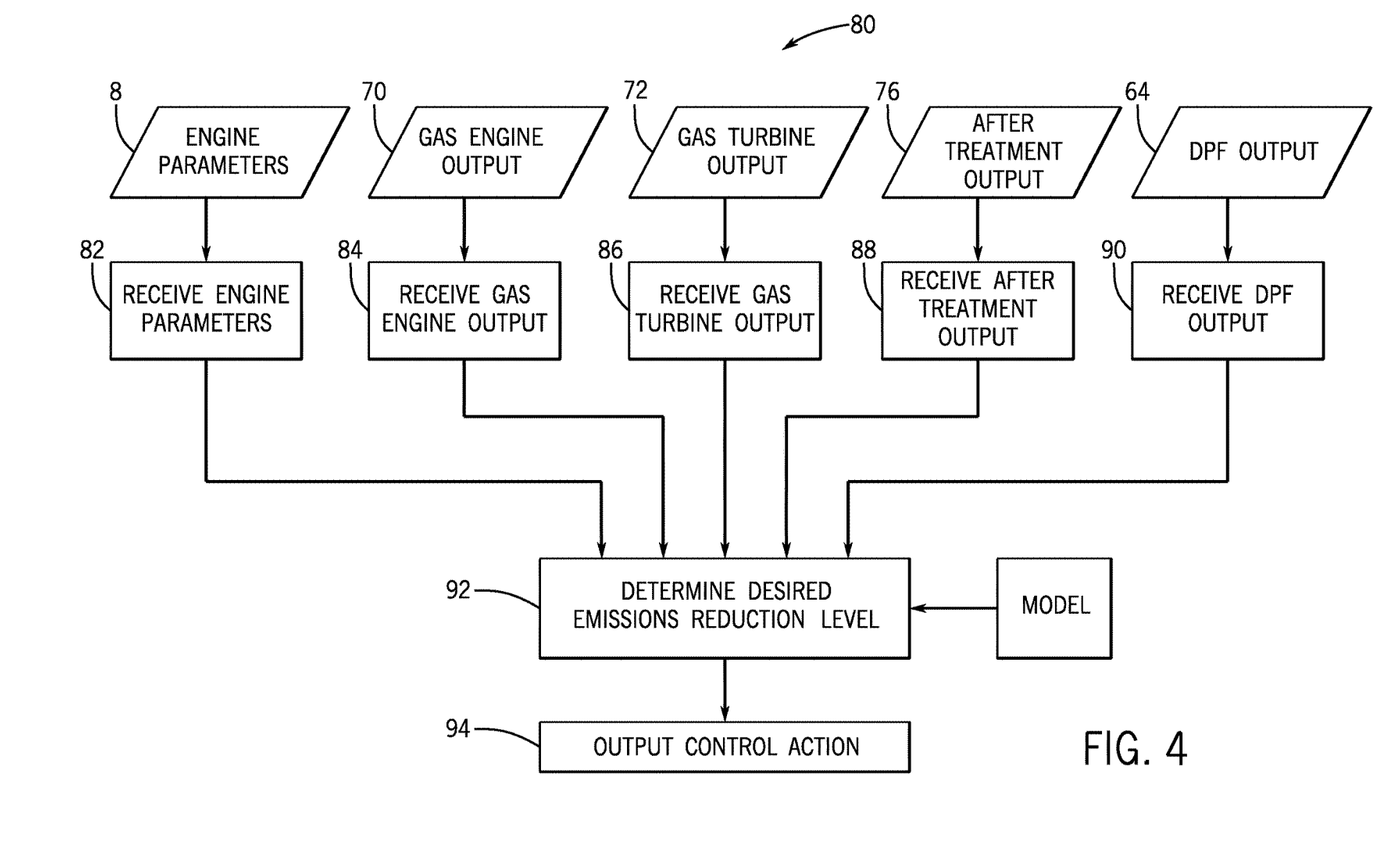
FIG. 4 is a flow chart of an embodiment of a computer-implemented method for controlling an amount of reductant injected into the exhaust flow upstream of a catalyst assembly.

FIG. 4 is a flow chart of an embodiment of a computer-implemented method 80 for controlling an amount of reductant injected to an exhaust flow upstream of a catalyst assembly 22. All or some of the steps of the method 80 may be executed by the controller 50 (e.g., utilizing the processor 62 to execute programs and access data stored on the memory 54). The method 80 further includes receiving actual operating parameters from the engine (block 82). The method 80 may include receiving signals corresponding to the emissions of the output of the gas engine 14 exhaust upstream of the catalyst assembly (block 84) and to the emissions of the output of the gas turbine engine 12 exhaust upstream of the catalyst assembly (block 86). The method 80 may include receiving signals corresponding to the aftertreatment output (block 88). The method 80 may include receiving signals representative of a pressure drop across the DPF system (block 90). The method 80 includes using the controller 50 to determine a desired emissions reduction level of the exhaust flows entering the catalyst assembly by using a kinetics-based model (block 92). The method 80 includes using the desired temperature and a model to output a control action to inject an amount of reductant such that the exhaust flows entering the SCR catalyst assembly cause a desired reduction in emissions (block 94).

Technical effects of the subject matter include using a controller to cause an amount of a reductant to be injected upstream of the catalyst assembly to reduce emissions. Controlling the reductant level injected into the exhaust flows enables the level of $NO_x$ conversion to be controlled to achieve a desired conversion level. The controller may be used to generate the control signal which corresponds to a desired reductant injection amount to inject into the exhaust flow to prior to flowing into the catalyst assembly. The exhaust flow may include a mixed exhaust flow (e.g., exhaust from the turbine engine and the gas engine) that is mixed after the gas engine exhaust is treated in a DPF system to reduce particulate matter and soot. The controller uses various signals to generate the reductant injection command. The signals may include signals representative of a pressure drop across the DPF system, emissions levels measured by one or more engine output sensors (e.g., downstream of the gas engine), emissions levels measured by one or more gas turbine engine output sensors (e.g., downstream of the gas turbine engine), operating conditions of the engine, emissions levels measured by one or more aftertreatment sensors disposed downstream of the SCR catalyst assembly.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an emissions reduction system configured to treat emissions from a hybrid power plant, wherein the emissions reduction system comprises:
  a catalyst system comprising an oxidation catalyst and a selective catalytic reduction (SCR) catalyst;
  a diesel particulate filter (DPF) configured to reduce particulates or soot from an exhaust flow from a gas engine;
  a first sensor disposed upstream of the catalyst system configured to measure one or more emissions of the exhaust flow of the gas engine prior to flowing into the catalyst system to generate a first signal representative of the one or more emissions;
  a second sensor disposed upstream of the catalyst system configured to measure one or more emissions of an exhaust flow of a gas turbine engine prior to flowing into the catalyst system to generate a second signal representative of the one or more emissions;
  a third sensor disposed downstream of the catalyst system configured to measure a one or more emissions of an outlet of the catalyst system to generate a third signal representative of the one or more emissions;
  a fourth sensor disposed upstream of the DPF and a fifth sensor disposed downstream of the DPF, wherein the fourth and fifth sensors are configured to measure a change in pressure across the DPF and generate a fourth signal and a fifth signal representative of the change in pressure; and
  a controller communicatively coupled to the catalyst system and the sensors, wherein the controller is programmed to receive the first, the second, the third, the fourth, and the fifth signals to generate a first control signal representative of a reductant injection command to control an amount of reductant injected, via an injection system, into a mixture of the exhaust flows of the gas engine and the gas turbine engine prior to flowing into the catalyst based on at least the first, second, and third signals.

2. The system of claim 1, wherein the controller is programmed to receive additional signals representative of actual operating parameters of the gas turbine engine, the gas engine, or both from one or more additional sensors disposed upstream of both the DPF and the catalyst system.

3. The system of claim 1, wherein the first, second, and third sensors are each configured to measure levels of ammonia, carbon monoxide, nitric oxides, or any combination thereof.

4. The system of claim 1, wherein the reductant comprises ammonia, urea, or a combination thereof.

5. The system of claim 1, wherein the controller is configured to utilize a model to generate the first control signal.

6. The system of claim 5, wherein the model comprises a kinetics-based model.

7. The system of claim 6, wherein the model comprises a catalyzed particulate filter (CPF) soot estimator and a kinetics-based model.

8. The system of claim 6, wherein the model comprises a diesel oxidation catalyst kinetics model.

9. The system of claim 6, wherein the model comprises a selective catalyst reduction kinetics model with an ammonia ($NH_3$) storage estimator.

10. The system of claim 1, wherein the DPF is disposed between the catalyst system and the gas engine and the gas turbine engine.

11. The system of claim 1, wherein the first sensor and the second sensor are disposed downstream of the gas engine and the gas turbine engine respectively and upstream of the DPF.

12. The system of claim 1, wherein a mixer is disposed downstream of the DPF and upstream the catalyst system.

13. The system of claim 1, wherein the one or more emissions comprises carbon monoxide, nitrogen oxide, nitrogen dioxide, hydrocarbons, or any combination thereof.

14. A hybrid power plant comprising:
a gas turbine engine;
a gas engine;
an emissions reduction system configured to treat emissions from a hybrid power plant, wherein the emissions reduction system comprises:
a catalyst system comprising an oxidation catalyst and a selective catalytic reduction (SCR) catalyst;
a diesel particulate filter (DPF) assembly configured to reduce particulates or soot from an exhaust flow from a gas engine;
a first sensor disposed upstream of the catalyst system configured to measure one or more emissions of the exhaust flow of the gas engine prior to flowing into the catalyst system to generate a first signal representative of the one or more emissions;
a second sensor disposed upstream of the catalyst system configured to measure one or more emissions of an exhaust flow of a gas turbine engine prior to flowing into the catalyst system to generate a second signal representative of the one or more emissions;
a third sensor disposed downstream of the catalyst system configured to measure a one or more emissions of an outlet of the catalyst system to generate a third signal representative of the one or more emissions;
a fourth sensor disposed upstream of the DPF and a fifth sensor disposed downstream of the DPF, wherein the fourth and fifth sensors are configured to measure a change in pressure across the DPF and generate a fourth signal and a fifth signal representative of the change in pressure; and
a controller communicatively coupled to the catalyst system and the sensors, wherein the controller is programmed to receive the first, the second, the third, the fourth, and the fifth signals to generate a first control signal representative of a reductant injection command to control an amount of reductant injected, via an injection system, into a mixture of the exhaust flows of the gas engine and the gas turbine engine prior to flowing into the catalyst system based on at least the first, second, and third signals.

15. The hybrid power plant of claim 14, wherein the controller is programmed to receive additional signals representative of actual operating parameters of the gas turbine engine, the gas engine, or both from one or more additional sensors disposed upstream of both the DPF and the catalyst system.

16. The hybrid power plant of claim 14, wherein the first, second, and third sensors are each configured to measure levels of ammonia, carbon monoxide, nitric oxides, or any combination thereof.

17. The hybrid power plant of claim 14, wherein the reductant comprises ammonia, urea, or a combination thereof.

18. The hybrid power plant of claim 14, wherein the controller is configured to utilize a model to generate the first control signal.

19. The system of claim 18, the model comprises a kinetics-based model, a linear regression model, or any combination thereof.

20. A method for operating a hybrid power plant having a gas turbine engine and a gas engine comprising:
receiving a first signal representative one or more emissions of an exhaust flow of the gas engine prior to flowing into a catalyst system;
receiving a second signal representative of a one or more emissions of an exhaust flow of the gas turbine engine prior to flowing into the catalyst system;
receiving a third signal representative of one or more emissions of an outlet of the catalyst system;
receiving a fourth signal and a fifth signal representative of a change in pressure across a diesel particulate filter (DPF);
generating a control signal based at least in part on the first signal, the second signal, the third signal, the fourth, and the fifth signal to regulate an amount of reductant injected upstream of the catalyst system; and
regulating a level of emissions reduction from the exhaust flows from the gas turbine and the gas engine.

* * * * *